(12) United States Patent
Schubert et al.

(10) Patent No.: US 12,285,979 B2
(45) Date of Patent: Apr. 29, 2025

(54) TWO-WAY TIRE PRESSURE MONITORING SYSTEM (TPMS) LEARNING AND AUTHENTICATED PAIRING

(71) Applicant: Ford Global Technologies, LLC, Dearborn, MI (US)

(72) Inventors: Jochen Schubert, Farmington Hills, MI (US); Dilip B. Patel, Novi, MI (US); Arick Evan Rushing, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 133 days.

(21) Appl. No.: 18/321,341

(22) Filed: May 22, 2023

(65) Prior Publication Data

US 2024/0391278 A1     Nov. 28, 2024

(51) Int. Cl.
*B60C 23/04* (2006.01)
*H04W 12/0471* (2021.01)
*H04W 76/14* (2018.01)

(52) U.S. Cl.
CPC ..... *B60C 23/0455* (2013.01); *H04W 12/0471* (2021.01); *H04W 76/14* (2018.02)

(58) Field of Classification Search
CPC .............. B60C 23/0455; H04W 76/14; H04W 12/0471
USPC ........................................................ 340/442
See application file for complete search history.

(56) References Cited

U.S. PATENT DOCUMENTS

| | | | |
|---|---|---|---|
| 9,950,577 B1 * | 4/2018 | Marlett | ............... B60C 23/0437 |
| 2012/0126967 A1 | 5/2012 | McCormick et al. | |
| 2012/0281699 A1 * | 11/2012 | Jia | .......... H04W 8/005 |
| | | | 370/392 |
| 2014/0188348 A1 * | 7/2014 | Gautama | ............... B60W 10/30 |
| | | | 701/48 |
| 2014/0256304 A1 | 9/2014 | Frye et al. | |
| 2015/0029016 A1 | 1/2015 | Lesesky et al. | |
| 2016/0318475 A1 | 11/2016 | Honkanen | |
| 2017/0164192 A1 * | 6/2017 | Schussmann | ....... H04W 12/041 |
| 2017/0326926 A1 * | 11/2017 | So | ........ B60C 23/0474 |
| 2019/0092283 A1 * | 3/2019 | Kristinsson | ............ B60Q 1/482 |
| 2022/0242175 A1 * | 8/2022 | Houston | ............. B60C 23/0416 |
| 2022/0332152 A1 * | 10/2022 | Fu | ....... B60C 23/0444 |

(Continued)

FOREIGN PATENT DOCUMENTS

WO     2022039719 A1    2/2022

OTHER PUBLICATIONS

Bogdan Groza et al., Identity-Based Key Exchange on In-Vehicle Networks: Can-FD & Flexray, Sensors 2019, 19, 4919, MDPI, Nov. 12, 2019, 1-17.

*Primary Examiner* — Zhen Y Wu
(74) *Attorney, Agent, or Firm* — Frank Lollo; Eversheds Sutherland (US) LLP (57) ABSTRACT

Systems and methods for implementing two-way tire pressure monitoring system (TPMS) learning and authenticated pairing. A random value may be used to determine a test value and a pairing PIN by use of a HMAC (Hash-based Message Authentication Code) function and a pre-shared key that is accessible to a TPMS sensor and a vehicle (e.g., controller system thereof). The random value and test value may be broadcasted by the TPMS sensor and received by the vehicle. The vehicle may calculate the pairing PIN using the random value and the pre-shared key.

20 Claims, 7 Drawing Sheets

(56) References Cited

U.S. PATENT DOCUMENTS

2023/0236081 A1* 7/2023 Yu ........................... H04W 4/80
2023/0239945 A1* 7/2023 Guilloux ........... H04W 72/0453
                                                      370/329
2023/0256780 A1* 8/2023 Houston ............. H04W 12/069
                                                       701/29.4

* cited by examiner

TWO-WAY TIRE PRESSURE MONITORING SYSTEM (TPMS) LEARNING AND AUTHENTICATED PAIRING

BACKGROUND

Wireless technologies such as Bluetooth® provide for the ability to perform communications between a wide range of devices. However, the use of wireless technologies can present many challenges surrounding security and privacy. Determining whether to trust a device presents many challenges, as wireless signals may be intercepted by malicious third parties who may attempt to eavesdrop on the data being transmitted between paired devices, perform a man-in-the-middle attack by altering data that is being transmitted, impersonating a device or device type in an attempt to gain trust, or other various malicious activities.

Therefore, the use of wireless technologies such as Bluetooth-based technologies for communications between a vehicle and tire pressure monitor system (TPMS) presents many challenges. For example, the ability to securely pair a TPMS may be a significant aspect of secure or protected communications.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is directed to systems and methods for secure tire pressure monitoring system (TPMS) pairing. Techniques described herein may be utilized to allow for a vehicle and one TPMS to establish a secure communications channel that can be used by the TPMS to relay tire information to the vehicle, where it can be monitored, analyzed, presented, etc.

Protecting sensor data in Tire Pressure Monitoring Systems (TPMS) is relevant for a variety of reasons. Wheel sensors communicate can use wireless communications to send sensor data to the vehicle using ultra high frequency (UHF) broadcasts, such as tire data and static sensor IDs. Security measures can be taken to prevent this data from being observed by other wireless devices within range of the vehicle. Security measures may be implemented for a variety of purposes such as to prevent data spoofing by malicious users to create a fake flat tire alert or cause other issues by hiding that a tire is underinflated. Security measures may mitigate or eliminate privacy concerns related to the broadcast static sensor IDs, which could potentially be used to identify and/or track the vehicle. In various embodiments, secure two-way TPMS communications are implemented using Bluetooth Low Energy (BLE), which can resolve various privacy and/or security concerns through the use of common security controls, such as use of link layer encryption, changeable Resolvable Private Addresses (RPAs), and inclusion of Message Authentication Codes (MACs) in TPMS messages.

Pairing of TPMS with a vehicle presents unique challenges. Bluetooth devices and their applications typically require various security keys to be shared confidentially. This sharing of confidential cryptographic material typically occurs through pairing/bonding following a user's manual actions (e.g., holding a button to put a Bluetooth device into pairing mode, entering a pairing PIN on their phone, etc.), but these actions are not viable when TPMS sensors are expected to be auto-learned by the vehicle. Further, authenticated pairing between Bluetooth devices usually involves a user interaction with an input/output (I/O) device or peripheral of some kind (e.g., a display on one device shows a temporary PIN, other device allows PIN to be entered via a keyboard, etc.), which again is not viable for easily and automatically learning TPMS sensors to a vehicle. Furthermore, it is not practical or even feasible to integrate a screen into TPMS sensors. Techniques described herein may include protocols for establishing a shared secret between a TPMS sensor and vehicle through an auto-learn process (or a manual learn event) while also keeping the shared secret data confidential and hidden from other nearby devices.

As described in greater detail below, various embodiments of the present disclosure may be utilized to implement techniques for two-way tire pressure monitoring system (TPMS) learning and authenticated pairing. In various embodiments, a handshake process in accordance with the techniques below is utilized to establish secure sharing of TPMS sensor data.

Illustrative Embodiments

Figure 1:
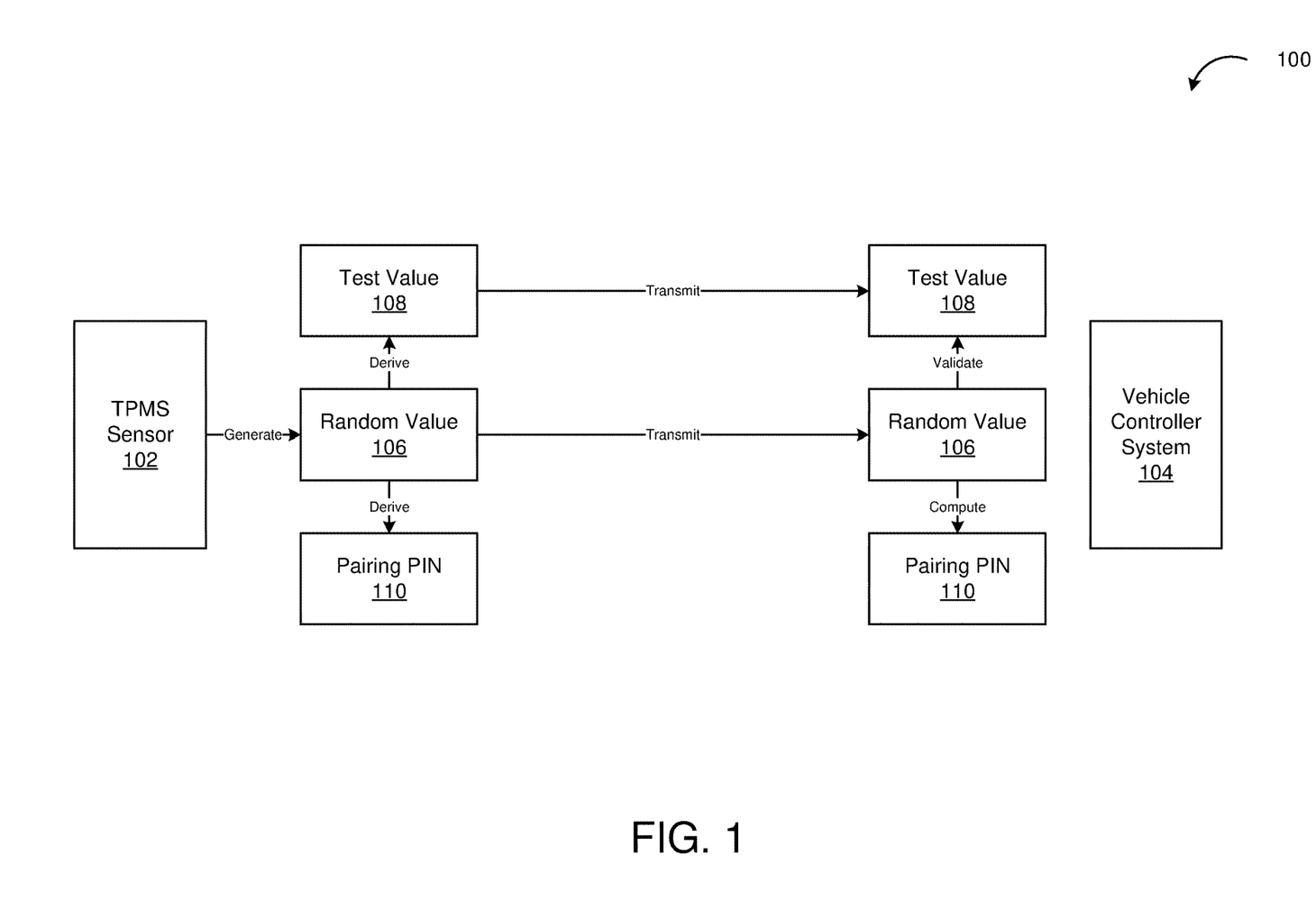
FIG. 1 illustrates a diagram depicting an example of two-way tire pressure monitor system (TPMS) sensor learning and authenticated pairing according to at least one embodiment of the present disclosure.

FIG. 1 illustrates a diagram 100 depicting an example of two-way tire pressure monitor system (TPMS) sensor learning and authenticated pairing according to at least one embodiment of the present disclosure.

In various embodiments, a TPMS sensor 102 may initialize, change, or otherwise determine a new resolvable private address (RPA). A RPA may refer to a temporary identifier (e.g., a Bluetooth address) that can be used to protect the privacy of a device when it is communicating with other devices. In various embodiments, the RPA can be used in Bluetooth Low Energy (BLE) technology, which may be described herein as an example of a type of wireless communications that facilitates two-way communications between a TPMS and vehicle.

The RPA may be characterized as a randomly generated address that is different from the device's permanent MAC address. When a device is advertising or scanning for other devices in the vicinity, it can use an RPA instead of its permanent MAC address. This makes it more difficult for others to track the device's movements or identify it through its MAC address. In various embodiments, RPAs are not entirely random and may encode non-random data that can be traced to authorized parties such as the device manufacturer or network administrator.

In various embodiments, a vehicle controller system 104 will, after drive cycle detection, listen for new sensors, perform auto-locate processes, or perform various other steps to determine when a potential or candidate pairing partner is detected. This may be performed as part of a learning process to identify the location of candidate sensors and whether they are attached to the vehicle and/or the location of the candidate sensors.

In various embodiments, a TPMS will, after drive cycle detection, perform a sequence of operations to determine a PIN and test value. The PIN may refer to a temporary pairing PIN that can be used to establish a secure connection between the TPMS and the vehicle. In various embodiments, the PIN and test value are derived from a random value. As an example, the TPMS may generate a random number 106 and determine an input value. The input may be determined entirely or partly based on the random number 106. Additional information, such as a protocol version, may be encoded in the input. The input value may be provided as an input to a one-way function, such as a HMAC (hash-based machine authentication code) operation to produce an output value. In various embodiments, the HMAC operation also operates based on a key, which may be a pre-shared key that is accessible to both the TPMS and the vehicle. The shared key may be provisioned to the TPMS and vehicle as part of their respective manufacturing processes. Example HMAC algorithms include HMAC-SHA-256, HMAC-SHA-512, HMAC-MD5, and others.

The output value of the one-way function may be used to determine a test value 108 and a pairing PIN 110. In various embodiments, the output is truncated and the truncated portion of the output is used to determine a PIN according to a specific format. For example, if the HMAC output is a N-bit binary value, then the truncated portion may be a M-bit binary value where M<N. A modulus operation may be performed to map the M-bit binary value to a decimal pairing PIN. For example, a BLE pairing PIN may have a value between 0 and 999,999 (base 10) and the pairing PIN may be computed by computing the base 10 value of the M-bit binary value modulus 1,000,000. A second portion of the output value may be used to generate a test value. The portions of the HMAC output used to generate the test value and pairing PIN are, in various embodiments, non-overlapping portions of the HMAC output.

In various embodiments, the TPMS will broadcast learning mode advertisements. The learning mode advertisements may include various data, such as the RPA, random value, and test value, as described above. The learning mode advertisements may furthermore include tire data, such as tire pressure values, temperature values, battery status information, signal strength, etc. It should be noted that the learning mode advertisements will, in various embodiments, be broadcasted in plaintext and will not include the pairing PIN.

The vehicle controller system 104 may listen for learning mode advertisements (e.g., using BLE technology) to determine whether the advertisements are for the vehicle's sensors. For example, two vehicles that are next to each other may receive learning advertisements from the others' TPMS sensors. Learning mode advertisements from unlearned sensors may be tracked. RPA and tire data may be used to determine which candidate sensors are attached to the vehicle and which ones are not. RPA and tire data may be analyzed and used to discard random and test values for non-attached sensors.

In various embodiments, the vehicle determines from the learning mode advertisements that a RPA is associated with an attached sensor and will use the random value and test value in the associated learning mode advertisements to determine the pairing PIN for the attached sensor. It should be noted that although the pairing PIN is not directly transmitted in the learning mode advertisements, the vehicle may nevertheless have the ability to derive the pairing PIN based on the random value and test value and through use of the pre-shared key. The vehicle may use the random value 106 from the learning mode advertisement to determine an input value to a one-way function. The input value may be based on additional data, such as a protocol version. If multiple protocol version are supported, the vehicle may generate multiple input values. The input value(s) may be used as an input to a keyed one-way function (e.g., HMAC operation) that also uses the pre-shared key to generate an output value. The output value may be used to determine a computed test value 108, for example, by taking a second portion of the computed test value (e.g., last M-bits of the output value). The computed test value 108 may be compared against the test value included in the learning mode advertisement. If the computed test value matches the received test value from the learning mode advertisement, then the vehicle may use this as an indication that the vehicle is able to determine the pairing PIN 110 for the vehicle. The pairing PIN 110 may be determined by truncating the computed output value and performing a modulus operation, for example, in the same manner as the TPMS sensor. The pairing PIN may therefore be determined by the vehicle.

Once the vehicle has determined the pairing PIN 110 from the learning mode advertisements, the vehicle may transmit a message to the TPMS sensor to connect to the potential sensor. The derived pin may be placed on a BLE stack by the TPMS sensor. In various embodiments, the TPMS sensor and the vehicle may perform an authenticated BLE pairing with located sensor by performing a pairing and bonding process using the deprived pairing PIN. This may involve a passkey entry or numeric comparison. Once the authenticated BLE pairing is completed, the vehicle may generate an integrity key (IK). The vehicle or the TPMS sensor may start link layer encryption and perform a routine for establishing BLE secure connection. The routine may comprise a mutual exchange of identity resolving keys (IRKs) and message integrity keys. The IRK may refer to is a unique key that is generated by the BLE-enabled device and is used by both the BLE device and the authorized devices to resolve the RPA and establish a connection.

The establishment of a BLE secure connection may be used to indicate the end of learning mode and normal TPMS operations may commence thereafter. The TPMS sensor may subsequently active a normal TPMS mode of operation that involves TPMS advertisements being broadcasted.

TPMS advertisements may comprise a new RPA (e.g., different from learning mode RPA), tire data, and a tag. The tag may refer to a message authentication code (MAC). The tag may be used to provide cryptographically verifiable assurances of integrity and/or authenticity. In various embodiments, the vehicle uses the exchanged IRKs to resolve new RPAs from learned sensors, and uses the integrity keys to verify the received tags. The vehicle may compute a tag over the received tire data using the integrity key. The computed tag may be compared against the received tag and if they match, then the received tire data may be determined as being genuine. However, if the computed tag and the received tag do not match, the entire TPMS advertisement may be discarded as being not trustworthy.

In various embodiments, the TPMS sensor periodically changes the RPA and provide the updated RPA value to the vehicle using the IRK.

Figure 2:
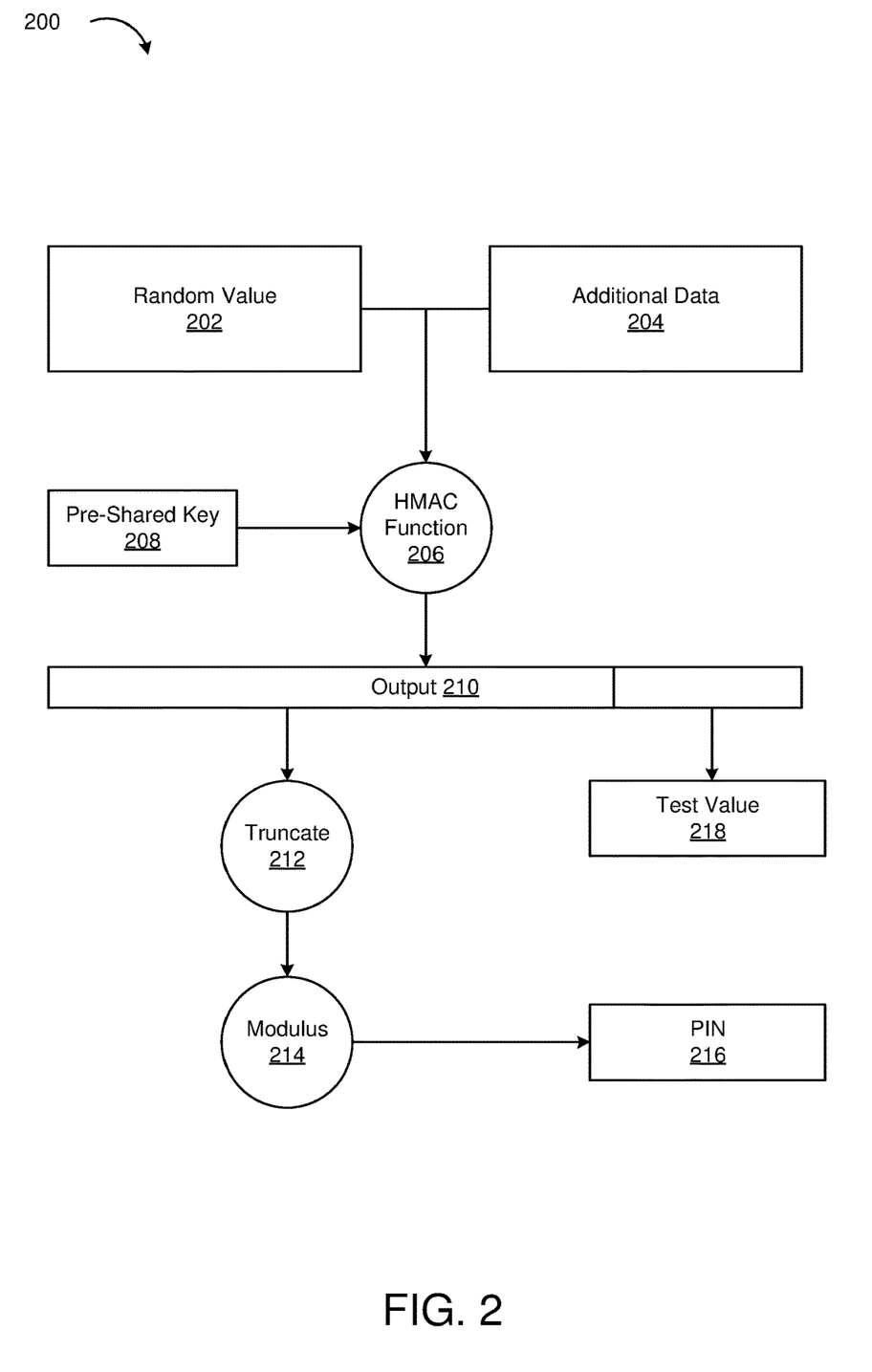
FIG. 2 illustrates a diagram depicting an example of a technique for generating a test value and corresponding pairing PIN that can be securely shared according to at least one embodiment of the present disclosure.

FIG. 2 illustrates a diagram 200 depicting an example of a technique for generating a test value and corresponding pairing PIN that can be securely shared, according to at least one embodiment of the present disclosure.

FIG. 2 depicts a non-limiting, illustrative example of how to derive a test value and PIN that can be used in a two-way authenticated pairing process. The test value and PIN may be generated by a tire pressure monitor system (TPMS) sensor and used to establish a secure connection over a wireless communications channel with a vehicle or control unit thereof.

In various embodiments, a system (e.g., TPMS sensor) generates, obtains, or otherwise determines random value 202. While a random value is depicted in FIG. 2, it may be a pseudo-random number that is deterministically generated using a seed value. Generally speaking, a random value as discussed herein may be a number that appears sufficiently random but is not necessarily generated using a process that is truly unpredictable, such as radioactive decay or atmospheric noise. For example, a pseudo-random number generator may be used to generate random values in various embodiments described herein.

Additional data 204 may refer to deterministic information that is used to determine an input value. The deterministic information may include information such as version number, model number, or other information that does not necessarily differ across multiple routines for generating test and PIN numbers. In some embodiments, the additional data 204 is included in TPMS advertising messages. In some embodiments, the additional data 204 is a predetermined and finite list that is agreed upon by the parties ahead of time. For example, the additional data may encode a list of supported BLE protocol versions. In some embodiments, additional data 204 includes a nonce value.

HMAC function 206, in various embodiments, refers to a HMAC (Hashed Message Authentication Code) function that can be used to generate a message authentication code (MAC). A MAC refers to a cryptographic construct that can be used to verify the authenticity and integrity of a message. In various embodiments, a HMAC function 206 uses a one-way cryptographic function to produce a message authentication code using a secret key to create a message authentication code. FIG. 2 depicts the use of pre-shared key 208 as the secret key. In various embodiments, HMAC function takes two inputs: an input message and a secret key. It then applies a specific hashing algorithm to the message, combines it with the secret key, and applies the hashing algorithm again to the result. Example HMAC algorithms include HMAC-SHA-256, HMAC-SHA-512, HMAC-MD5, and others. This process generates a fixed-size output known as the HMAC. The HMAC output is depicted as output 210 in FIG. 2.

Pre-shared key 208 may refer to cryptographic material that is known and shared between two parties that are privileged to perform secure two-way communications. In some embodiments, pre-shared key 208 refers to a symmetric cryptographic key that is accessible or known to both a TPMS sensor and a vehicle (e.g., vehicle control unit). In some embodiments, the pre-shared key is a private key associated with the TPMS sensor that is also accessible to a service (e.g., vehicle manufacturer server) that can be accessed by privileged entities such as an authorized vehicle. For example, the TPMS sensor and the vehicle may both be registered to the same user, which grants the vehicle access to directly view the pre-shared key 208 or have the server perform operations using the pre-shared key (e.g., HMAC function 206).

Output 210 may refer to the output value produced by a HMAC function 206. The output 210 may be used to derive a test value and a pairing PIN. The pairing PIN may be determined in the following manner, according to at least one embodiment: output 210 is provided as an input to a truncate 212 function that takes a first portion of output 210. For example, if the output 210 is X-bits long, then truncate 212 may take the first Y-bits of output 210 where Y<X. The truncated output may be a binary value. The truncated output may be provided as an input to a modulus 214 operation that maps the truncated output to a number between 0 and 999,999. The PIN 216 may require that the value be between 000000 and 999999 (e.g., a six digit decimal number with leading zeros, if needed). The PIN 216 is not shared in plaintext to other entities, according to various embodiments. The PIN may be used as part of a pairing or bonding process between two entities, such as the TPMS sensor and the vehicle control unit described above.

The same output 210 used to derive PIN 216 may also be used to derive test value 218. Test value 218 may be derived as a truncated portion of output 210. For example, if output 210 is X-bits long, then the test value 218 may be the last Z-bits of output 210 where Z<X. In various embodiments, PIN 216 and test value 218 are derived from non-overlapping portions of output 210. For example, if the output 210 is X-bits long, then the PIN 216 may be derived using the first Y-bits of output 210 and the test value 218 may be derived using the last Z-bits of output 210 where X=Y+Z. In some embodiments, test value 218 is generated using all of output 210 or a different portion (e.g., overlapping or non-lapping portion) of output 210. For example, in one embodiment, test value 218 is generated using a non-keyed cryptographic hash function, checksum function, or cyclic redundancy check using output 210 or a portion thereof.

Figure 3:
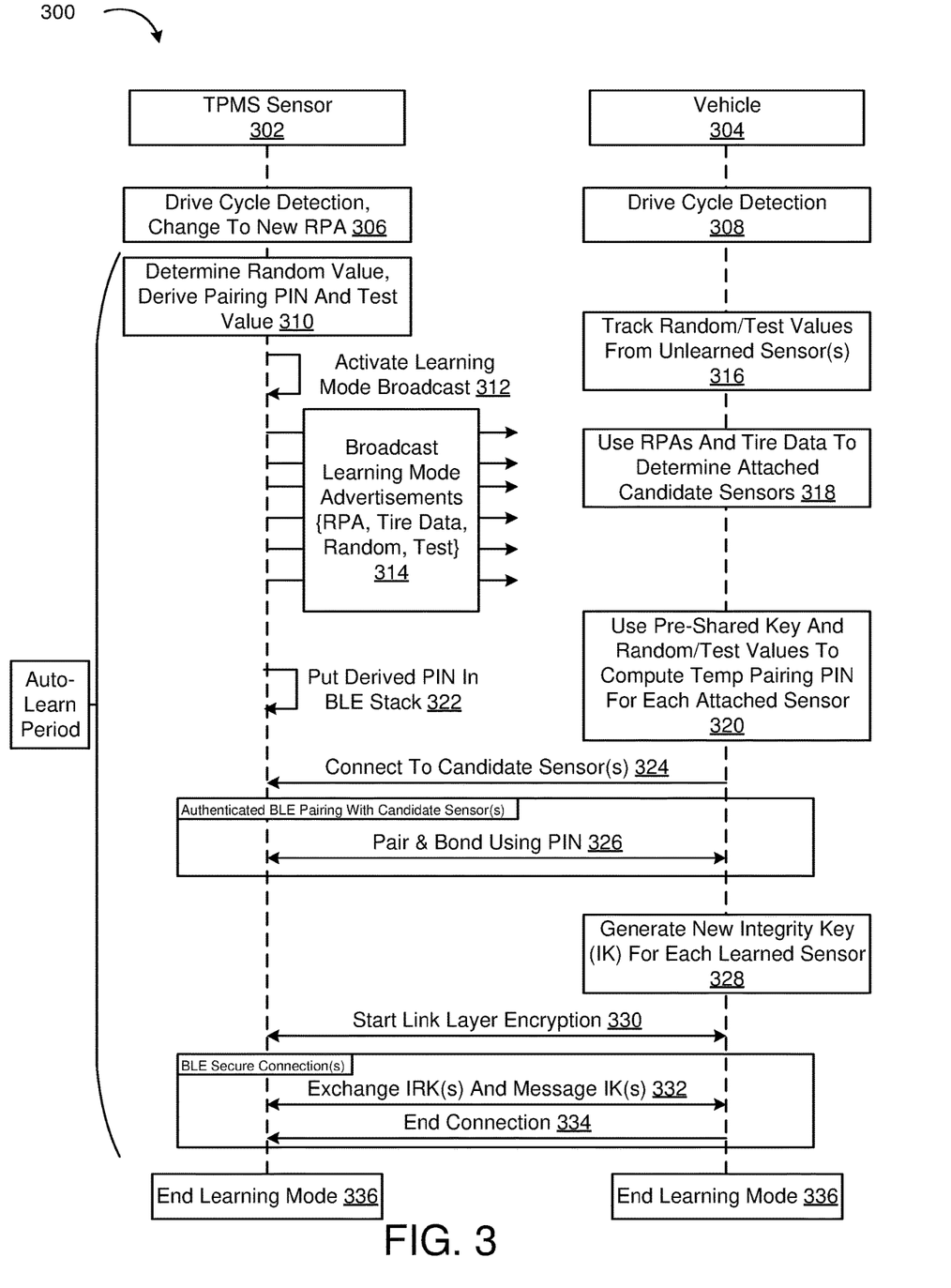
FIG. 3 illustrates a diagram depicting an example protocol for two-way tire pressure monitor system (TPMS) learning and authenticated pairing according to at least one embodiment of the present disclosure.

FIG. 3 illustrates a diagram 300 depicting an example protocol for two-way tire pressure monitor system (TPMS) learning and authenticated pairing, according to at least one embodiment of the present disclosure. The protocol depicted in FIG. 3 is utilized to establish a secure connection between TPMS sensor 302 and vehicle 304 that can be used to exchange cryptographic material (e.g., integrity key).

In various embodiments, a TPMS sensor 302 is provisioned with a BLE identity resolving keys (IRK). The IRK may refer to is a unique key that is generated by the BLE-enabled device and is used by both the BLE device and authorized devices to resolve RPAs establish a secure connection. TPMS sensor 302 and vehicle 304 may both be provisioned with or otherwise have access to a pre-shared secret. The pre-shared secret may be provisioned at time of manufacturing and may be securely stored, for example, in a trusted platform module (TPM) or a security module.

TPMS sensor 302 may detect the start of a new drive cycle and change to a new resolvable private address (RPA). A RPA may refer to a temporary identifier (e.g., a Bluetooth address) that can be used to protect the privacy of a device when it is communicating with other devices. In various embodiments, the RPA can be used in Bluetooth Low Energy (BLE) technology, which may be considered as an example of a type of wireless communications that facilitates two-way communications between TPMS sensor 302 and vehicle 304. Vehicle 304 may likewise independently determine the start of a new drive cycle or manual learn trigger 308.

Learning mode may be used by a vehicle when new TPMS sensors are installed or when the tires are rotated or changed. The process for entering the learning mode can vary depending on the vehicle, but typically involves following a series of steps in a specific order. In various embodiments, the vehicle enters learning mode when a button or a combination of buttons on the dashboard or steering wheel is pressed in a specific order. The TPMS will then enter a special mode where it can detect and program the TPMS sensors.

In various embodiments, the detection of a new drive cycle or manual learn trigger may initiate the start of an auto-learn period. TPMS sensor 302 may determine a random value (e.g., generate random number) and derive a pairing PIN and test value 310 using the random value. For example, techniques discussed in connection with FIG. 2 may be used to generate the pairing PIN and test value. The TPMS sensor 302 may activate learning mode broadcast 312 and being to broadcast learning mode advertisements 314. The TPMS sensor 302 may broadcast, in each learning mode advertisement message, the aforementioned RPA, random value, and test value. In addition, the learning mode advertisement message may include tire data, such as pressure and/or temperature data that is measured. Vehicle 304 may track the random/test values from unlearned sensor(s) 316. Temp received random values may include tuples of RPA and random values that are tracked. The vehicle 304 may use RPAs and tired data to determine attached candidate sensors 318. The random and test values for non-attached sensors may be discarded. The position of the candidate sensors may be determined—for example, the positions for a vehicle may include front left tire, front right tire, rear right tire, and rear left tire. Corresponding RPAs may be determined for each respective position based on the learning mode advertisements.

Once one or more candidate sensors are identified, the pre-shared key and random/test values may be used to derive a temp pairing PIN for each attached sensor. It should be noted that the PIN is not included in the advertising messages because they may be viewed by other parties. Vehicle 304 may nevertheless have the ability to derive the pairing PIN based on the random value and test value received in the learning mode advertisements and through use of the pre-shared key. The vehicle may use the random value from the learning mode advertisement to determine an input value to a HMAC function. The input value may be used as an input to a keyed one-way function (e.g., HMAC operation) that also uses the pre-shared key to generate an output value. The output value may be used to determine a computed test value, for example, by taking a second portion of the computed test value (e.g., last M-bits of the output value). The computed test value may be compared against the test value included in the learning mode advertisement. If the computed test value matches the received test value from the learning mode advertisement, then the vehicle may use this as an indication that the vehicle is able to determine the pairing PIN for the vehicle. The pairing PIN may be determined by truncating the computed output value and performing a modulus operation, for example, in the same manner as the TPMS sensor. The pairing PIN may therefore be determined by the vehicle. TPMS sensor 302 may store the derived PIN in a BLE stack 322, which allows it to determine whether the vehicle 304 is in possession of the correct pairing PIN.

In various embodiments, vehicle 304 determines a computed PIN and submits a request to connect to TPMS Sensor 302, which will be considered a candidate sensor. An authenticated BLE pairing with TPMS sensor 302 may be performed in which the TPMS sensor 302 and the vehicle 304 are paired and bonded using the PIN 326. In various embodiments, a passkey entry or numeric comparison is performed. The derived and calculated PINs must match in order for the pairing to be performed. In various embodiments, vehicle 304 will generate an integrity key (IK) for each learned sensor 328. For example, if TPMS sensors on four tires are being learned, then there may be a first IK generated for the first tire, a second IK generated for the second tire, a third IK generated for the third tire, and a fourth IK generated for the fourth tire. Each of the tires may also have its own corresponding BLE IRK.

A BLE secure connection may be established between the vehicle 304 and each candidate sensor (e.g., TPMS sensor 302 of FIG. 3). The BLE secure connection may provide cryptographically verifiable assurances of confidentiality, and the BLE IRK and IK may be exchanged using the secure connection 332. Once the BLE IRK and IK have been exchanged, the secure connection may be terminated (e.g., end connection 334) as a measure to increase battery life.

Once the integrity key(s) have been exchanged with all of the learned sensors, the sensor(s) (e.g., TPMS sensor 302) and vehicle 304 may end learning mode 336 and normal TPMS operations may connection, for example, as discussed below in connection with FIG. 4.

Figure 4:
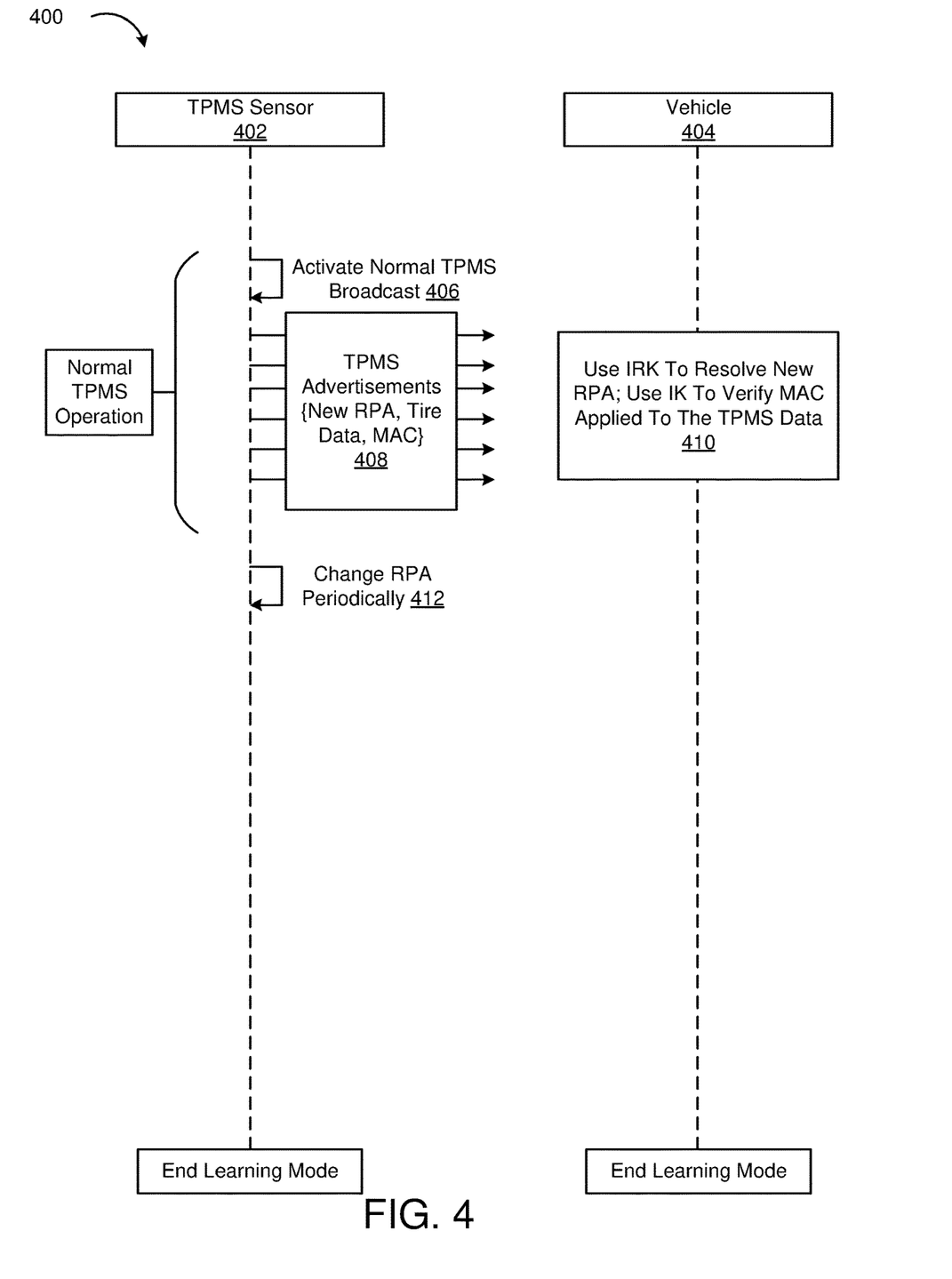
FIG. 4 illustrates a diagram depicting an example protocol for two-way tire pressure monitor system (TPMS) secure communications according to at least one embodiment of the present disclosure.

FIG. 4 illustrates a diagram 400 depicting an example protocol for two-way tire pressure monitor system (TPMS) secure communications, according to at least one embodiment of the present disclosure. The protocol depicted in FIG. 4 is utilized to establish a secure connection between TPMS sensor 402 and vehicle 404 that can be used to exchange cryptographic material (e.g., integrity key).

In various embodiments, TPMS sensor 402 and vehicle 404 both have access to a message integrity key (IK). The IK may be determined using techniques described in connection with FIG. 3. Notably, it may be the case that a test value and random value are transmitted in plaintext from TPMS sensor 402 to vehicle 404 and vehicle 404 is able to compute the pairing PIN by virtue of having access to use a pre-shared secret.

TPMS sensor may send TPMS advertisements comprising a new RPA, tire data, and a MAC 408. The MAC may be generated over at least the tire data and using the IK. The MAC may be generated over the RPA as well.

In various embodiments, vehicle 404 receives the TPMS advertisements and uses the IRK to resolve the new RPA and uses the IK to verify the MAC applied to the TPMS data 410. A RPA can be resolved by a device if it has the peer device's IRK. In various embodiments, the Resolvable Private Address has a 24-bit prand and 24-bit Hash. The prand and IRK of the peer devices are used to resolve the address. When vehicle 404 receives the Resolvable Private Address, it extracts the Hash and prand from it. Then a Local Hash value is generated using the IRK of the peer device and the prand extracted from the address. This Local Hash value is compared with the Hash extracted from the address. The address is resolved if they match. If a device has more than one peer IRK, the device repeats this procedure for each stored IRK to determine if the received Resolvable Private Address is associated with any of the stored IRKs. It does so until either address resolution is successful for one of the IRKs or all have been tried.

In various embodiments, the vehicle 404 computes a MAC using the received tire data, RPA, etc. and determines whether the computed MAC matches the received MAC. The MAC is computed using the IK that is exchanged between the TPMS sensor 402 and the vehicle 404, for example, as described above in connection with FIG. 3. If the values match, the integrity and authenticity of the received messages may be confirmed, and the tire data may be accepted, but if they do not match, the received tire data may be discarded as being potentially unreliable or not trustworthy. In various embodiments, TPMS sensor 402 will change the RPA periodically 412 to provide for privacy of the vehicle 404 and prevent tracking of the vehicle based on the broadcasted RPA values.

Figure 5:
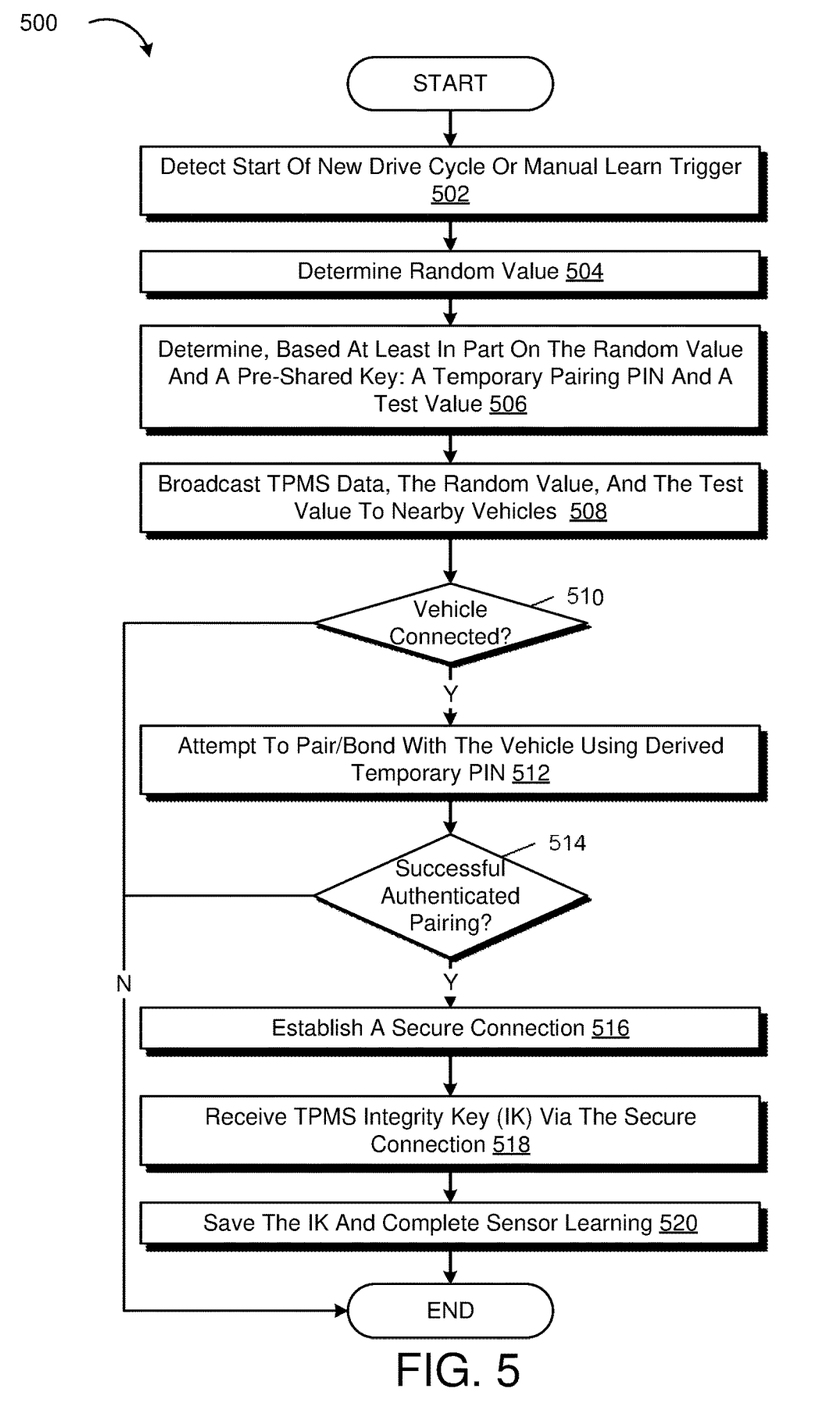
FIG. 5 shows an illustrative example of a process for two-way learning and authenticated pairing with a vehicle or controller system thereof in accordance with one or more example embodiments of the present disclosure.

FIG. 5 shows an illustrative example of a process 500 for two-way learning and authenticated pairing with a vehicle or controller system thereof, in accordance with one or more example embodiments of the present disclosure. In at least one embodiment, some or all of the process 500 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program storing a plurality of computer-readable instructions executable by one or more processors. The computer-readable storage medium, in at least one embodiment, is a non-transitory computer-readable medium. In at least one embodiment, at least some of the computer-readable instructions usable to perform the process 500 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 500 may be implemented in the context of various systems and methods described elsewhere in this disclosure, such as those discussed in connection with FIGS. 1-4. In at least one embodiment, process 500 or a portion thereof is collectively implemented by a tire pressure monitor system (TPMS) sensor.

In various embodiments, process 500 starts at the top of FIG. 5 and begins with step 502 where the system (e.g., TPMS sensor) performing process 500 will detect start of new drive cycle or manual learn trigger. A manual learn trigger may be initiated by a user (e.g., driver) by pressing a specific sequence or combination of buttons.

In various embodiments, process 500 comprises a step 504 to determine a random value. While a random value is referenced in step 504, it may be a pseudo-random number that is deterministically generated using a seed value. Generally speaking, a random value as discussed herein may be a number that appears sufficiently random but is not necessarily generated using a process that is truly unpredictable, such as radioactive decay or atmospheric noise. For example, a pseudo-random number generator may be used to generate random values in various embodiments described herein.

In various embodiments, process 500 comprises a step 506 to determine, based at least in part on the random value and a pre-shared key: a temporary pairing PIN and a test value. In various embodiments, the test value and pairing PIN are determined in accordance with techniques discussed above in connection with FIG. 2. For example, a TPMS sensor may generate a random value (e.g., using a seed), determine an input value by concatenating the random value with additional data, provide the input value as a message and the pre-shared key as a secret key to a HMAC function that produces an output value, use a first portion of the output value as the test value, and then perform truncate and modulus operations on a second portion of the output value to derive the pairing PIN. In various embodiments, non-overlapping portions of the HMAC's output value are used to generate the test value and the pairing PIN, which can be used to make the overall protocol more secure.

In various embodiments, process 500 comprises a step 508 to broadcast TPMS data, the random value, and the test value to nearby vehicles. TPMS data may refer to tire data such as temperature and pressure measurements. The random value and test value may be derived in the manner referenced above. When the TPMS is in advertising mode, a Resolvable Private Address (RPA), test value, and random value may be included in TPMS advertisement messages. The TPMS advertisement messages may be transmitted in plaintext—that is, no specific cryptographic material is required to view the RPA, TPMS data, random value, or test value.

In various embodiments, process 500 comprises a step 510 to determine whether a vehicle is connected. In various embodiments, a wireless connection—for example, using Bluetooth technologies, is used to establish a wireless connection between the TPMS sensor and the vehicle. If no connection is detected, the process 500 may end immediately. Conversely, if a connection is established, then the process 500 may proceed to step 512

In various embodiments, process 500 comprises a step 512 to attempt to pair/bond with the vehicle using the derived temporary PIN. The PIN, as described above, may be derived from the random number generated or otherwise determined by the TPMS sensor. The vehicle may have access to the pairing PIN through the test value and the random value of an advertisement message transmitted by the TPMS sensor. For example, the vehicle may receive a TPMS advertisement message and extract the random value and the test value. An input value may be generated from the random value—in some embodiments, the input value is simply the random value. In some embodiments, the input value is a combination of the random value and additional data that is deterministic, such as a supported protocol version. The vehicle may then use the input value and the pre-shared key to calculate an output value using a HMAC function. The calculated output value or a portion thereof may be compared against the test value. If the comparison passes, then the calculated output value may be used to generate a calculated PIN, which may involve truncation operations, modulus operations, or a combination thereof. In various embodiments, the vehicle is able to successfully compute the same PIN which results in a successful authenticated pairing. If the vehicle is not able to compute the same PIN, it may indicate that the received advertisement was not generated by an authentic sensor with access to the pre-shared key.

In various embodiments, process 500 comprises a step 514 to determine whether there was a successful authenticated pairing. Successful authenticated pairing may occur when the same PIN is confidentially shared between the TPMS sensor and the vehicle through the test value and random value. If both entities have the same PIN, then the authenticated pairing is successful and process 500 may proceed to step 516; conversely, if the same PIN is not successfully shared with both entities, then the authenticated pairing is unsuccessful and process 500 may terminate immediately.

In various embodiments, process 500 comprises a step 516 to establish a secure connection. The secure connection may be implemented as a BLE link layer encryption. The secure connection may be implemented as authenticated encryption that provides cryptographically verifiable assurance of confidentiality and authenticity.

In various embodiments, process 500 comprises a step 518 to receive a TPMS integrity key (IK) via the secure connection. In various embodiments, the IK is securely shared using the pairing PIN. For example, the pairing PIN may be encrypted using the pairing PIN that acts as a cryptographic key, or using a cryptographic key derived thereof.

In various embodiments, process 500 comprises a step 520 to save the IK and complete the sensor learning process. Upon completion of sensor learning, the TPMS sensor may proceed to a normal TPMS mode of operation in which TPMS advertisement messages are sent rather than TPMS learning mode messages. Upon completion of process 500, the TPMS sensor and vehicle may have successfully completed a two-way authenticated pairing and learning process such that both entities have access to a pairing PIN and integrity key that is securely and confidentially shared.

Figure 6:
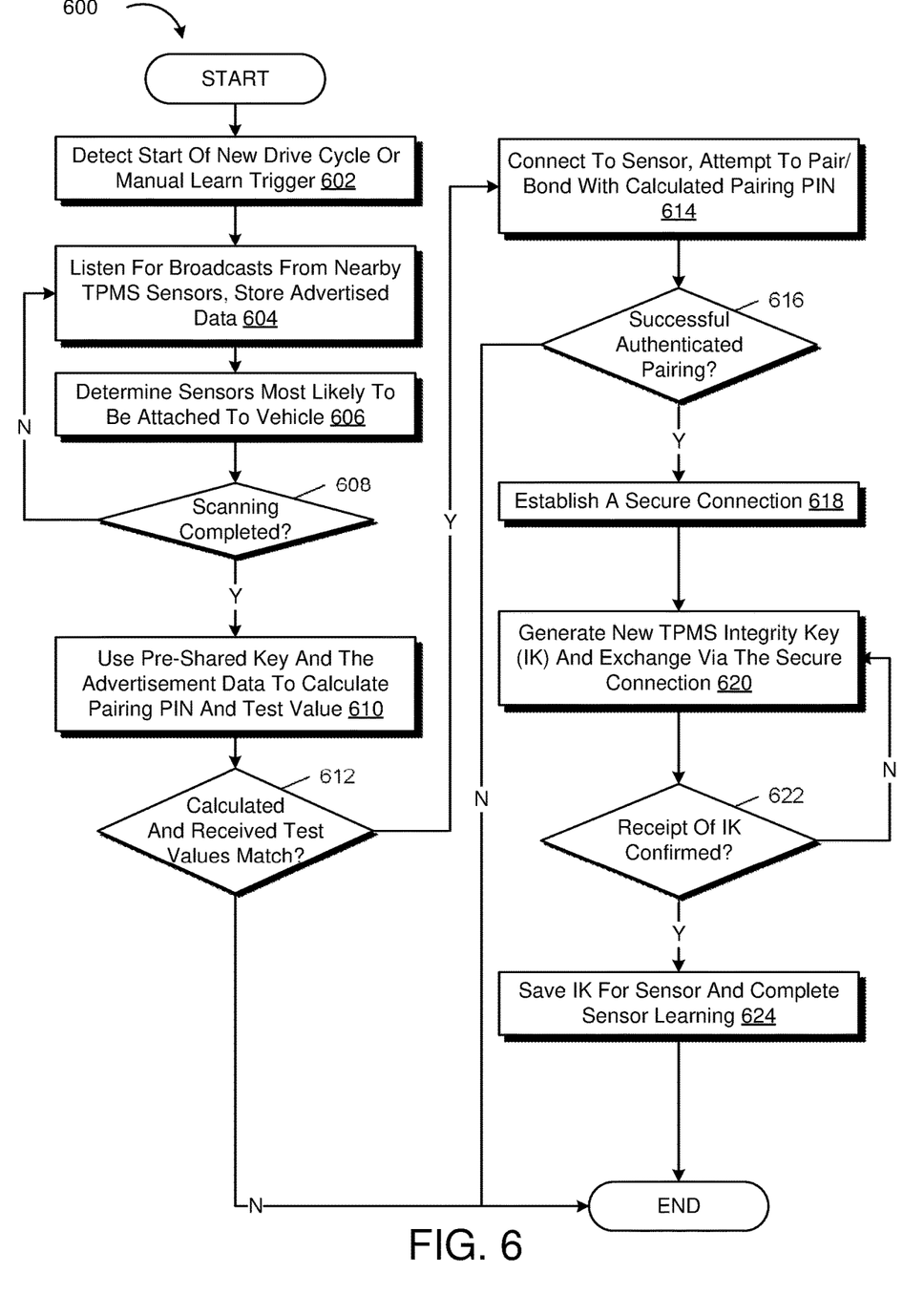
FIG. 6 shows an illustrative example of a process for two-way learning and authenticated pairing with a tire pressure monitor system (TPMS) sensor in accordance with one or more example embodiments of the present disclosure.

FIG. 6 shows an illustrative example of a process 600 for two-way learning and authenticated pairing with a tire pressure monitor system (TPMS) sensor, in accordance with one or more example embodiments of the present disclosure. In at least one embodiment, some or all of the process 600 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program storing a plurality of computer-readable instructions executable by one or more processors. The computer-readable storage medium, in at least one embodiment, is a non-transitory computer-readable medium. In at least one embodiment, at least some of the computer-readable instructions usable to perform the process 600 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 600 may be implemented in the context of various systems and methods described elsewhere in this disclosure, such as those discussed in connection with FIGS. 1-4. In at least one embodiment, process 600 or a portion thereof is collectively implemented by a controller system of a vehicle. In various embodiments, steps of process 600 and/or other processes are performed by a vehicle will utilize the controller system.

In various embodiments, process 600 starts at the top of FIG. 6 and begins with step 602 where the system (e.g., vehicle's controller system) performing process 600 will detect start of new drive cycle or manual learn trigger. A manual learn trigger may be initiated by a user (e.g., driver) by pressing a specific sequence or combination of buttons.

In various embodiments, process 600 comprises a step 604 to listen for broadcasts from nearby TPMS sensors. In various embodiments, the broadcast messages are transmitted wirelessly using Bluetooth technologies. In various embodiments, the advertised data comprises tire data, Resolvable Private Addresses (RPAs), and so on and so forth. The advertised data may be stored by the vehicle.

In various embodiments, process 600 comprises a step 606 to determine sensors most likely to be attached to the vehicle. As the advertised data is collected and stored, it may be analyzed to determine which sensors are emitting data that corresponds to the vehicle. For example, the advertised data may be used in learning mode to determine whether a sensor is attached to the vehicle and where it is most likely to be attached, such as a location FL (front left), FR (front right), RL (rear left), or RR (rear right).

In various embodiments, process 600 comprises a step 608 to determine whether scanning is completed. If scanning has not completed, the system may return to step 604 and continue to collect additional sensor data until there is at least one sensor that is determined to be a candidate sensor. Once scanning is completed, process 600 may proceed to step 610.

In various embodiments, process 600 comprises a step 610 to use a pre-shared key and the advertisement data to calculate a pairing PIN and test value. Learning mode advertisement messages may comprise or otherwise encode a test value and random value. The vehicle may obtain the random value and generate an input value using the random value. In some cases, the input value is simply the random value. The input value and the pre-shared secret may be provided to a HMAC function that calculates an output value. The calculated output value may be used to determine a calculated test value.

In various embodiments, process 600 comprises a step 612 to determine whether the calculated test value and the received test value from the learning mode advertisement value match. The value match if they are equal. If the values do not match, then the process 600 may terminate immediately, or the advertisement data may simply be discarded. If the values match, then the process 600 may proceed to step 614.

In various embodiments, process 600 comprises a step 614 to connect to the candidate sensor and attempt to pair/bond using the calculated pairing PIN. The pairing/bonding process may be in accordance with BLE standards and may involve the exchange of information using the pairing PIN so that the TPMS sensor may be able to verify whether the vehicle is in possession of the correct PIN.

In various embodiments, process 600 comprises a step 616 to determine whether successful authentication has occurred. In various embodiments, mutual authentication occurs where the TPMS sensor verifies that the vehicle is in possession of the correct PIN and the vehicle verifies that the TPMS sensor is in possession of the correct PIN. If not, the process 600 may terminate immediately; otherwise, process 600 may proceed to step 618.

In various embodiments, process 600 comprises a step 618 to establish a secure connection. The secure connection may be implemented as a BLE link layer encryption. The secure connection may be implemented as authenticated encryption that provides cryptographically verifiable assurance of confidentiality and authenticity.

In various embodiments, process 600 comprises a step 620 to generate a new TPMS integrity key (IK) and exchange with the TPMS sensor using the secure connection. The IK may be generated in any suitable manner. In some embodiments, the IK is derived from the pairing PIN.

In various embodiments, process 600 comprises a step 622 to determine whether receipt of IK is confirmed. In various embodiments, the TPMS sensor sends a confirmation message that the IK was successfully received. In various embodiments, process 600 comprises a step 624 to save the IK for sensor and complete sensor learning. In various embodiments, each IK is generated on a per-sensor basis, such that if there are four TPMS sensors, four separate IKs are generated, one for each sensor.

Figure 7:
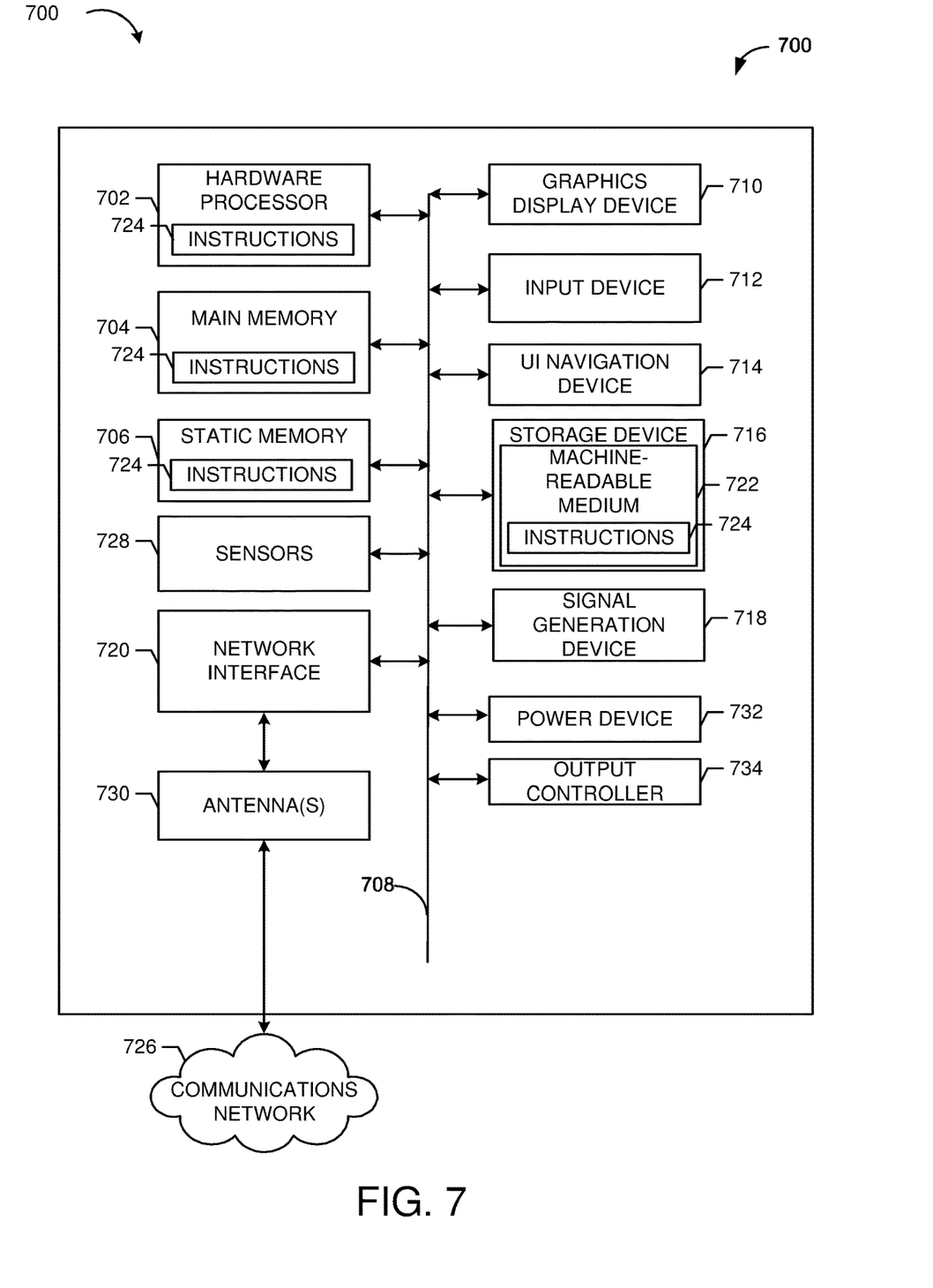
FIG. 7 illustrates a block diagram of an example of a machine or system upon which any one or more of the techniques (e.g., methodologies) discussed herein may be performed.

The machine (e.g., computer system) 700 may include any combination of the illustrated components. For example, the machine 700 may include a hardware processor 702 (e.g., a central processing unit (CPU), a graphics processing unit (GPU), a tensor processing unit (TPU) including an artificial intelligence application-specific integrated circuit (ASIC), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a data signal), a network interface device/transceiver 720 coupled to antenna(s) 730, and one or more sensors 728, such as a sound detecting sensor (e.g., a microphone), accelerometers, magnetometers, location sensors, and the like. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media. In various embodiments, a vehicle's controller system is implemented using one or more machines (e.g., machine 700).

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include DOCSIS, fiber optic, a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cable box, a wearable smart device, cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a wearable smart device, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, DOCSIS, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A tire pressure monitoring system (TPMS) sensor, comprising:
   one or more processors and memory storing executable instructions that cause the TPMS sensor to:
   determine a random value;
   determine, based at least in part on the random value, an input value;
   derive an output value based at least in part on the input value and a pre-shared secretkey that is also accessible to a vehicle;
   determine, based at least in part on a first portion of the output value, a test value;
   determine, based at least in part on a second portion of the output value, a pairing passcode (PIN);
   broadcast at least one learning mode advertisement, comprising:
   a Resolvable Private Addresses (RPA);
   sensor data measured by the TPMS sensor;
   the random value; and
   the test value;
   determine the TPMS sensor is connected to the vehicle;
   perform a pairing process with the vehicle that includes authenticating the vehicle has access to the pairing PIN; and
   contingent upon the pairing process successfully authenticating the vehicle:
   establish a secure connection with the vehicle; and
   receive an integrity key (IK) from the vehicle via the secure connection.

2. The TPMS sensor of claim 1, wherein the executable instructions include further instructions that further cause the TPMS sensor to:

broadcast a TPMS advertisement, comprising:
a second RPA;
second sensor data measured by the TPMS sensor; and
a Message Authentication Code (MAC) determined based at least in part on the second sensor data and using the IK.

3. The TPMS sensor of claim 1, wherein the input value comprises the random value and additional data.

4. The TPMS sensor of claim 1, wherein the output value is derived using a HMAC (Hash-based Message Authentication Code) function.

5. The TPMS sensor of claim 1, wherein the first portion and second portion are non-overlapping portions of the output value.

6. The TPMS sensor of claim 1, wherein the pairing PIN is determined by at least truncating the output value to determine the second portion and applying a modulus operation on the second portion to produce the pairing PIN.

7. The TPMS sensor of claim 1, wherein the at least one learning mode advertisement is broadcasted in plaintext.

8. A non-transitory computer-readable storage medium storing executable instructions that, as a result of being executed by one or more processors of a controller system of a vehicle, cause the controller system to at least:
receive one or more learning mode advertisements from a tire pressure monitoring system (TPMS) sensor, one of the one or more learning mode advertisement comprising:
a Resolvable Private Addresses (RPA);
sensor data measured by the TPMS sensor;
a random value; and
a test value;
determine, based at least in part on the sensor data, that the TPMS sensor is likely to be attached to the vehicle;
determine, using the random value and a pre-shared key that is also accessible to the TPMS sensor, a calculated test value;
determine that the calculated test value matches the test value received from the TPMS sensor;
determine, using the random value and the pre-shared key, a pairing passcode (PIN);
perform a pairing process with the TPMS sensor using the pairing PIN;
establish a secure connection with the TPMS sensor; and
provide an integrity key (IK) to the TPMS sensor via the secure connection.

9. The non-transitory computer-readable storage medium of claim 8, wherein the executable instructions further cause the controller system to:
receive a TPMS advertisement, comprising:
a second RPA;
second sensor data measured by the TPMS sensor; and
a Message Authentication Code (MAC);
determine a calculated MAC based at least in part on the second sensor data and using the IK; and
determine the TPMS advertisement is authentic based at least in part on the calculated MAC matching the MAC received in the TPMS advertisement.

10. The non-transitory computer-readable storage medium of claim 8, wherein the calculated test value is determined by at least:
determining an input value based at least in part on the random value;
using a HMAC function to calculate an output value based at least in part on the input value and the pre-shared key; and
extracting the test value from at least a first portion of the output value.

11. The non-transitory computer-readable storage medium of claim 10, wherein the pairing PIN is determined based at least in part on a second portion of the output value.

12. The non-transitory computer-readable storage medium of claim 11, wherein the first portion and the second portion are non-overlapping.

13. The non-transitory computer-readable storage medium of claim 8, wherein the one or more learning mode advertisements are received using Bluetooth Low Energy (BLE).

14. A method, comprising:
determining, by a tire pressure monitoring system (TPMS) sensor, a random value;
deriving, by the TPMS sensor, a pairing passcode (PIN) and a test value based at least in part on the random value and a pre-shared key;
transmitting, by the TPMS sensor, one or more learning mode advertisements that comprise first sensor data, the random value, and the test value;
determining, by a controller system of a vehicle, that the TPMS sensor is an attached candidate sensor;
determining, by the controller system of the vehicle, the pairing PIN using the random value, the test value, and the pre-shared key;
performing an authenticated pairing process between the controller system and the TPMS sensor;
establishing a secure connection between the controller system and the TPMS sensor; and
exchanging an integrity key (IK) and identity resolving keys (IRK) between the controller system and the TPMS sensor.

15. The method of claim 14, further comprising:
transmitting, by the TPMS sensor, one or more TPMS advertisements that comprise second sensor data and a Message Authentication Codes (MAC) based at least in part on the second sensor data; and
determining, by the controller system of the vehicle, authenticity and integrity of the one or more TPMS advertisements.

16. The method of claim 15, wherein:
each of the one or more learning mode advertisements comprises a first resolvable private address (RPA); and
each of the one or more TPMS advertisements comprises a second RPA.

17. The method of claim 16, further comprising:
changing the second RPA to a third RPA; and
using the IRK to resolve the third RPA.

18. The method of claim 14, wherein deriving the pairing PIN and the test value comprises:
generating an HMAC (Hash-based Message Authentication Code) output using the random value and the pre-shared key;
determining a first portion of the random value to be the test value;
truncating a second portion of the random value to produce a truncated HMAC output; and
performing a modulus operation on the truncated HMAC output to produce the pairing PIN.

19. The method of claim 18, wherein the first portion and the second portion are non-overlapping portions of the HMAC output.

20. The method of claim 14, wherein the one or more learning mode advertisements are transmitted in plaintext.

* * * * *